United States Patent [19]

Tanaka et al.

[11] Patent Number: 4,474,144
[45] Date of Patent: Oct. 2, 1984

[54] MOTORCYCLE ENGINE

[75] Inventors: Hideo Tanaka, Tokyo; Suminari Iwao, Saitama, both of Japan

[73] Assignee: Honda Giken Kogyo Kabushiki Kaisha, Tokyo, Japan

[21] Appl. No.: 343,725

[22] Filed: Jan. 29, 1982

Related U.S. Application Data

[62] Division of Ser. No. 155,415, Jun. 2, 1980, abandoned.

[30] Foreign Application Priority Data

Jun. 6, 1979 [JP] Japan .................................. 54-70781
Jun. 6, 1979 [JP] Japan .................................. 54-70782

[51] Int. Cl.³ .......................... F02B 75/22; B62D 21/02
[52] U.S. Cl. ............................. 123/52 MV; 123/55 VF;
123/195 A; 180/219; 180/297
[58] Field of Search ............ 123/195 A, 195 R, 52 M,
123/52 MV, 59 PC, 55 R, 55 VF, 55 VS, 579,
580; 180/219, 227, 228, 230, 297

[56] References Cited

U.S. PATENT DOCUMENTS 754,929  3/1904  Lepape ................................ 180/219
4,226,296  10/1980  Higaki ................................ 180/219

OTHER PUBLICATIONS

Schofield; "Petersen's Basic Carburetion and Fuel Systems"; 1971, pp. 30–39.

*Primary Examiner*—Craig R. Feinberg
*Attorney, Agent, or Firm*—Lyon & Lyon

[57] ABSTRACT

A multi-cylinder internal combustion engine is mounted on the frame body of a motorcycle. The engine has a front cylinder block extending forward and a rear cylinder block extending upward so that a V-shaped space is defined between the cylinder blocks. A downdraft carburetor supplies fuel to the front cylinder block and a lateral-draft carburetor supplies fuel to the rear cylinder block. Both carburetors are positioned in the V-shaped space and their air intake ports are in close proximity but offset laterally. The intake pipes to the carburetors have essentially the same length and geometrical arrangement. First and second exhaust systems for the two cylinder blocks are essentially the same length although the exhaust system for the front cylinder block extends under the engine to one side of the rear wheel of the motorcycle and the other exhaust system for the rear cylinder block extends at a higher elevation to the other side of the wheel.

1 Claim, 4 Drawing Figures

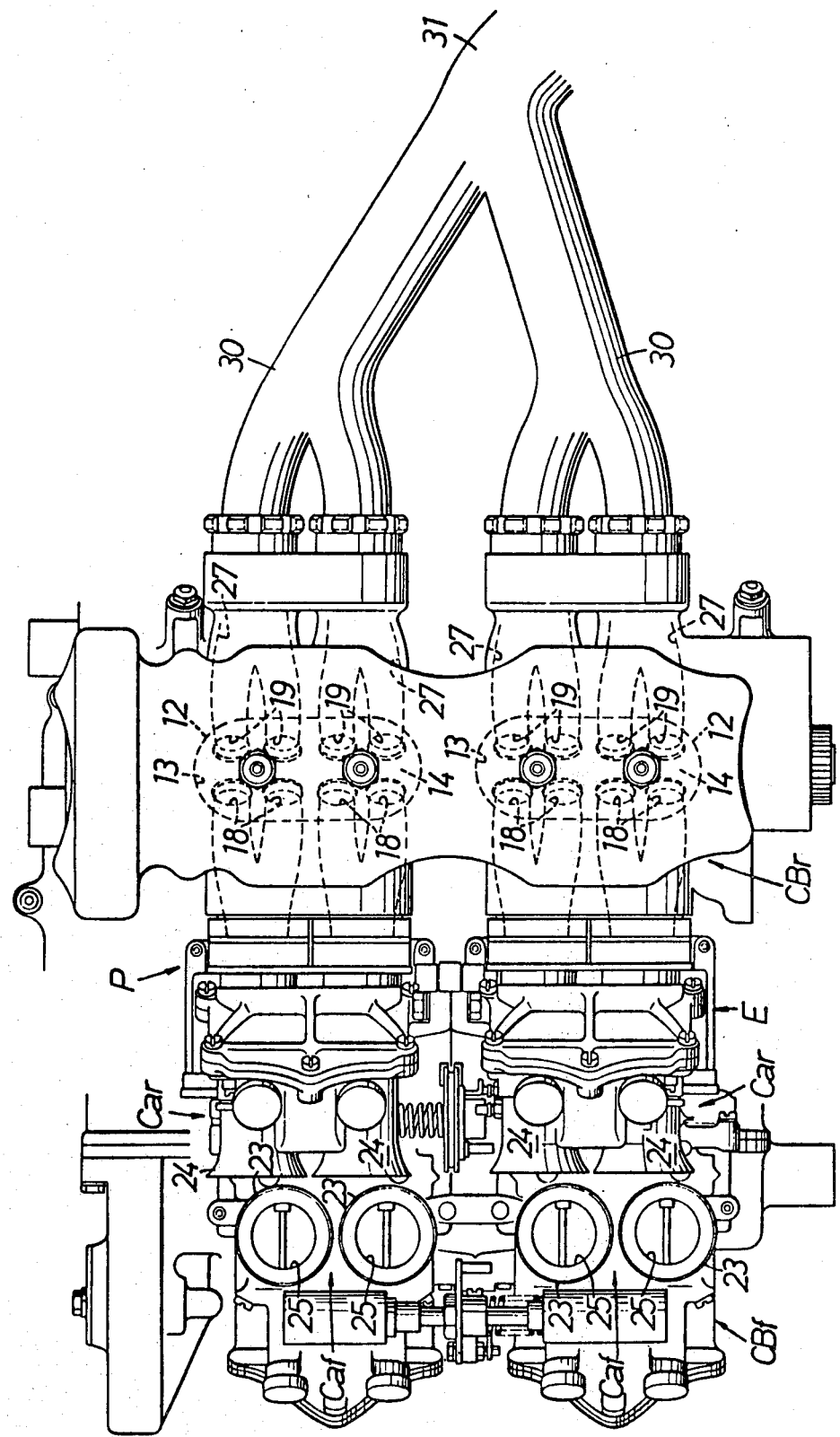

MOTORCYCLE ENGINE

This application is a division of application Ser. No. 155,415, filed on June 2, 1980 and is now abandoned.

This invention relates to internal combustion engines for motorcycles and is particularly directed to a V-type multi-cylinder four-cycle engine. Engines of this general type have been more complicated in the whole configuration and have greatest irregularities in the contour as compared with in-line engines. Also, more dead space occurs within the space envelope than the engine requires. Moreover, when more than one carburetor is employed they tend to project outward to increase the overall dimensions.

It is an object of this invention to provide a V-type multi-cylinder internal combustion engine which employs a front cylinder block extending toward the front of the motorcycle and a rear cylinder block extending upward toward the top of the frame, the two cylinder blocks defining a V-shaped space between them. Two carburetors are symmetrically positioned in such space, one being a downdraft carburetor supplying fuel to the front cylinder block and the other being a lateral-draft carburetor supplying fuel to the rear cylinder block. Substantially equal distribution of fuel to the two cylinder blocks is achieved by using intake passages of equal length and geometric design, to improve charging efficiency.

An exhaust system promotes exhaust efficiency by employing a first exhaust system for the front cylinder block which includes an exhaust manifold below the level of the engine and extending to one side of the rear wheel of the motorcycle. A second exhaust system is provided for the rear cylinder block in which an exhaust manifold is positioned at a higher elevation and discharges on the other side of the rear wheel. The exhaust passages of two cylinders in each block which have firing intervals of 360° crank phase angle to each other, discharge into a single exhaust manifold.

Other and more detailed objects and advantages will appear hereinafter.

In the drawings:

FIG. 4 is a top plan view of the engine.

Figure 1:
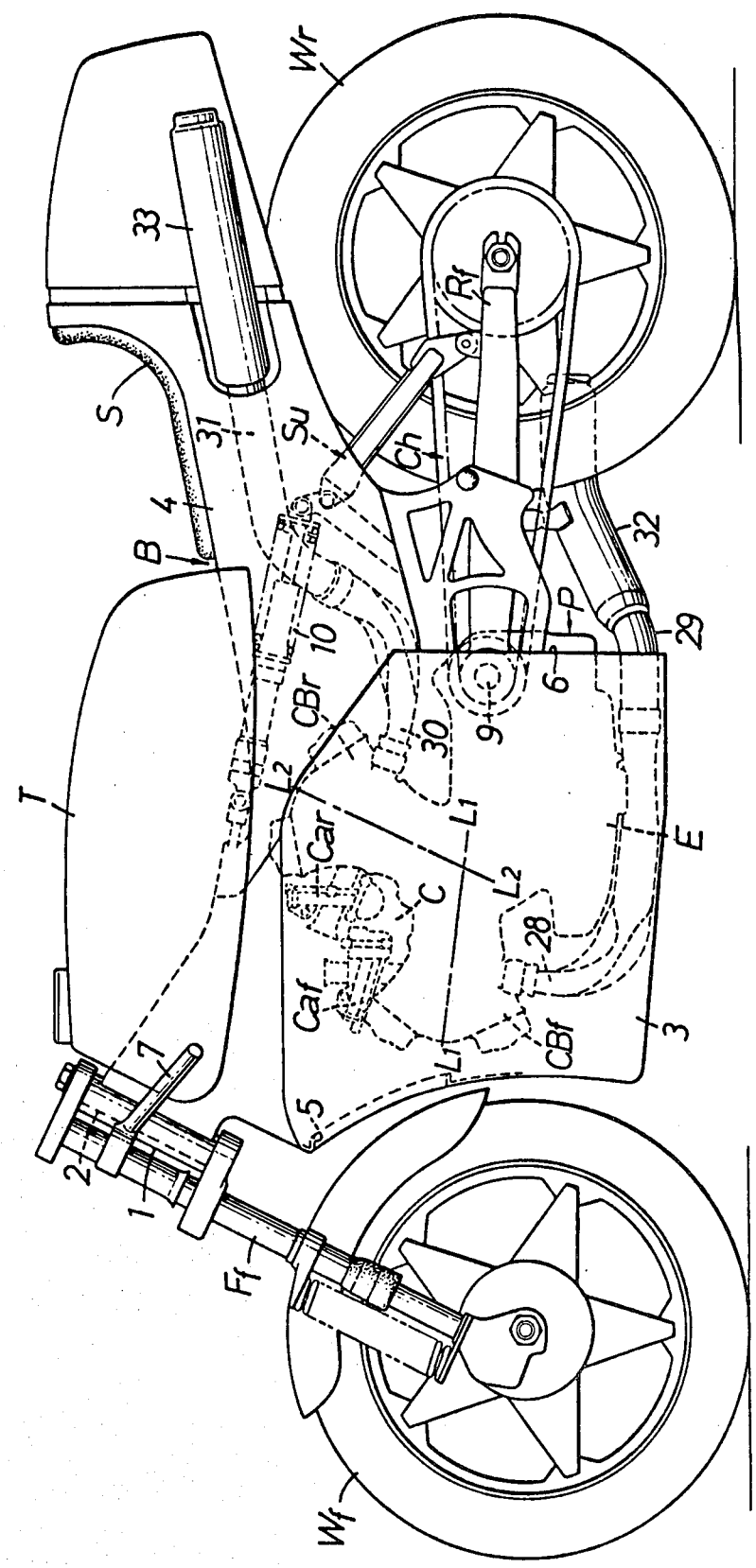
FIG. 1 is a side elevation showing a preferred embodiment of this invention.
Figure 2:
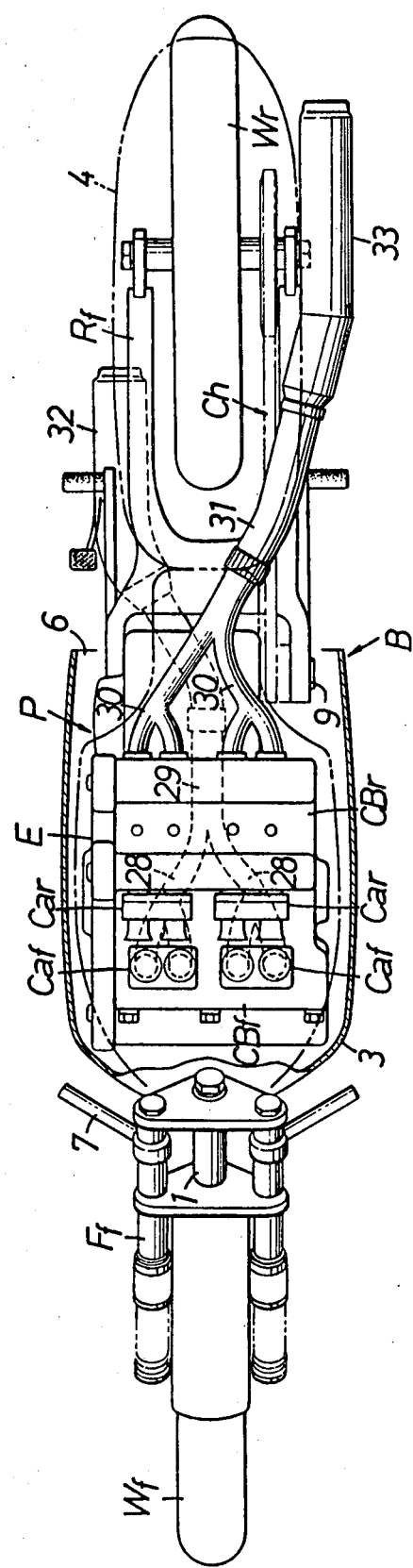
FIG. 2 is a top plan view partly in section.

Referring to the drawings, the frame body B is provided with a head pipe 1 at the front end, a front fork Ff supported by said head pipe 1 through a steering shaft 2, and supporting a front wheel Wr. The front fork Ff is of the telescopic type, and a steering handle 7 is secured to the upper end thereof. A power unit P is supported by the frame body B, and a rear fork Rf is pivotally supported on the rear portion of the power unit P and supports a rear wheel Wr. The rear fork Rf is suspended on the upper part of the frame body through the suspension mechanism Su and the cushion device 10.

The frame body B includes a cowling 3 formed of thin plate fastened to the head pipe 1 and extending downward toward the rear of the motorcycle. A seat stay 4 of channel-shaped section is removably connected to the rear end of said cowling 3 and extends above the rear wheel Wr. The cowling 3 is preferably formed into a hollow cylindrical shape, with an air inlet 5 open at the front end and an air outlet 6 open at the rear end, streamlined as a whole. The cowling 3 may be constructed of light alloy, plastic or other lightweight sheet materials, formed integrally or suitably segmented. The power unit P is housed in the cowling 3 and is integrally supported therewith. An output shaft 9 on the power unit P drives the rear wheel Wr through a chain power transmission mechanism Ch. A fuel tank T is mounted on top of the cowling 3, and a seat S for the riders is mounted on the seat stay 4.

In accordance with this invention, a V-type, multi-cylinder four-cycle internal combustion engine E has a front cylinder block CBf and a rear cylinder block CBr. The front cylinder block CBf extends toward the front of the frame body B and its cylinder centerline $L_1—L_1$ is slightly inclined upward with respect to a horizontal plane. The rear cylinder block CBr extends toward the top of the frame body B and its cylinder centerline $L_2—L_2$ is slightly inclined rearward with respect to a vertical plane.

The front cylinder block CBf and the rear cylinder block CBr are each provided with a pair of cylinders 12 arranged in parallel and extending laterally of the frame body B. All of the cylinders 12 are of the same construction and each has a piston 14 mounted to reciprocate within the cylinder wall 13. The cylinders and pistons preferably are not round in cross section but are oblong, that is, elongated circular shape or oval shape or substantially elliptical. Each of the pistons 14 is connected by a connecting rod 15 to a single crankshaft 16. The two pistons 14 in the front cylinder block CBf are connected to the crankshaft 16 at a crank phase angle of 360°. Similarly, the pair of pistons 14 in the rear cylinder block CBr are connected to the same crankshaft 16 at a crank phase angle of 360°.

The combustion chamber 17 in each cylinder wall 13 contains four intake valve ports 18 and four exhaust valve ports 19. Each intake valve port 18 is provided with an intake valve 20 and each exhaust valve port 19 is provided with an exhaust valve 21. The intake valves 20 and exhaust valves 21 are respectively connected to valve operating mechanisms V operating in timed relation with rotation of the crankshaft 16.

Figure 3:
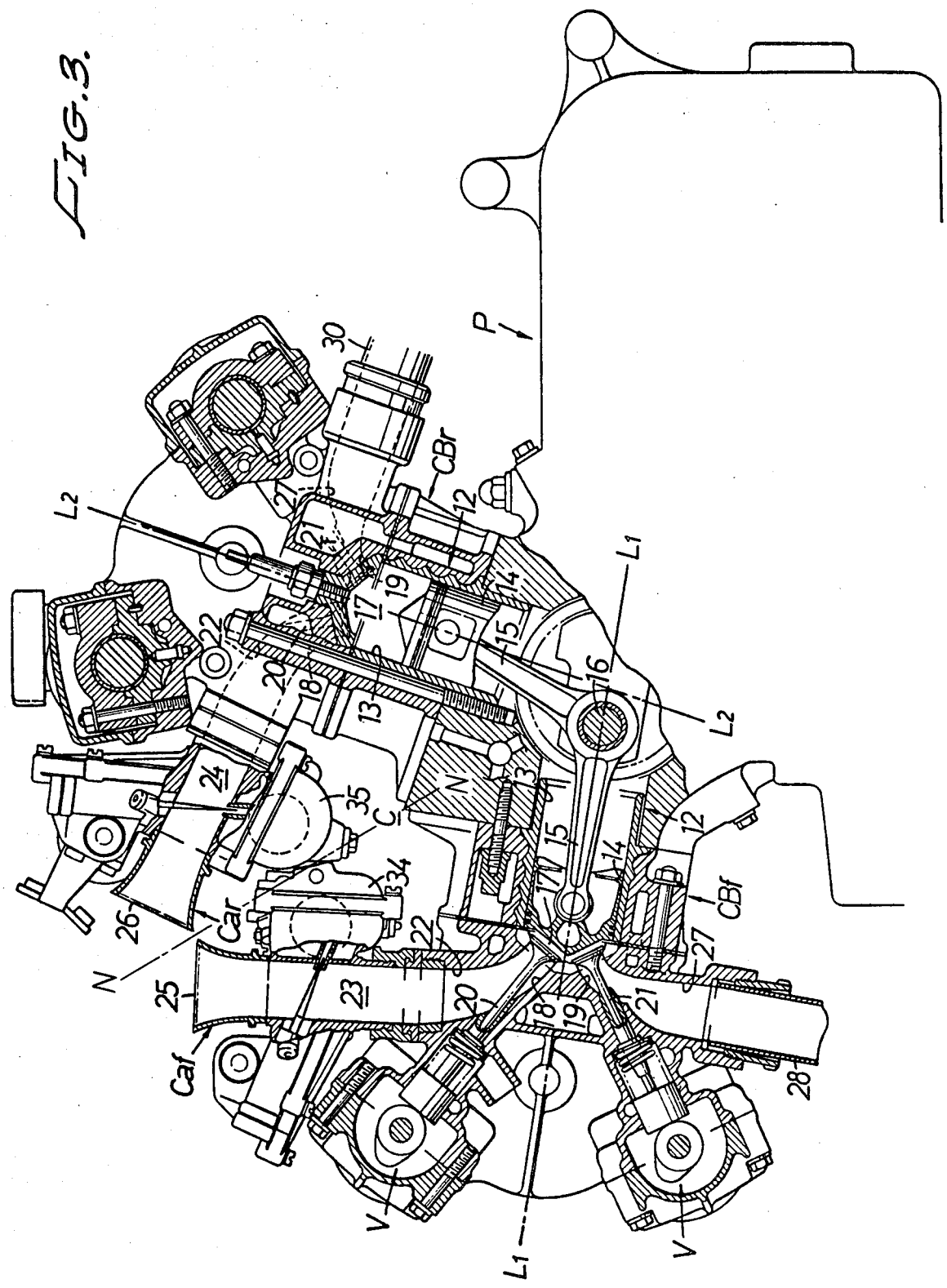
FIG. 3 is a sectional side elevation partly broken away of the essential part of an internal combustion engine according to this invention.

As shown in FIGS. 1 and 3, a V-shaped space C is formed between the front cylinder block CBf and the rear cylinder block CBr, and in this space C the downdraft front carburetor Caf and the lateral-draft rear carburetor Car are positioned. The carburetor Caf is located in the front half of the V-shaped space C, and the lateral-draft rear carburetor Car is positioned in the rear half of the V-shaped space C.

The intake passage 23 of the downdraft carburetor Caf is connected to intake ports 22 leading to each of the cylinders 12 in the front cylinder block CBf. Similarly, the intake passage 24 of the lateral-draft rear carburetor Car is connected to intake ports 22 leading to each of the intake valve ports of the rear cylinder block CBr. These intake passages 23 and 24 are disposed symmetrically about the plane of the bisection intermediate line N—N defined bisecting on the V-shaped space C and extending through the crankshaft 16. The float chambers 34 and 35 of the carburetors also extend into the V-shaped space C.

As best shown in FIG. 3, the intake passage 23 of the downdraft front carburetor Caf is upright while the intake passage 24 of the lateral-draft rear carburetor Car is closer to horizontal but is inclined somewhat with respect to a horizontal plane. The respective intake ports 25 and 26 of these intake passages 23 and 24 are disposed in close proximity to each other. The embodiment of this invention as shown in the drawings does not include an air cleaner; however, a single air cleaner can be provided to supply air to both the intake ports 25 and 26. As shown in FIG. 4, the intake passages 23 and 24 are offset laterally.

Exhaust valves 21 control flow through the exhaust valve ports 19 and into the exhaust passages 27, in both cylinder blocks. Exhaust pipes 28 are connected to the passages 27 in the front cylinder block CBf and lead to the exhaust manifold 29 under the engine E. Exhaust passages 27 connected to the rear cylinder block CBr are connected by exhaust pipes 30 to the exhaust manifold 31, above the level of the engine E. A first exhaust system for the front cylinder block CBf includes the exhaust passages 27, exhaust pipes 28, exhaust manifold 29, and muffler 32. A second exhaust system includes exhaust passages 27 in the rear cylinder block CBr, exhaust pipes 30 connected to them, the exhaust manifold 31 and the muffler 33. The first and second exhaust systems have substantially the same overall length. The muffler 32 lies on one side of the rear wheel Wr and the muffler 33 lies on the other side. The first exhaust system including the exhaust manifold 29 extends under the engine crankshaft 16, while the second exhaust system including the manifold 31 passes above the level of the crankshaft 16.

In operation, the internal combustion engine E drives the power unit P and its output is transmitted from the output shaft 9 to the rear wheel Wr through the chain power transmission mechanism Ch. The two cylinders 12 in the front cylinder block CBf operate at firing intervals of 360° crank phase angle. The same is true of the two cylinders 12 in the rear cylinder block CBr. The intake passages 23 and 24 for the carburetors Caf and Car are positioned symmetrically about the intermediate line N—N of the V-shaped space C and are practically equal in length. Therefore each cylinder 12 in each of the cylinder blocks is supplied with air-fuel mixture under the same conditions as to intake inertia, intake resistance, etc., whereby very little variation is present in the intakes to the cylinders 12, for improved engine performance. At the time of each intake no pressure is generated that impedes the intake flow, whereby intake inertia can effectively be utilized for improving charging efficiency. Exhaust gases are alternatively discharged into a separate exhaust manifold from each pair of cylinders 12 at intervals of 360° crank angle. At the time of each discharge there is no pressure generated in the exhaust system that impedes the discharge of exhaust gases, whereby exhaust resistance is minimized and exhaust inertia can effectively be utilized for higher exhaust efficiency.

In the embodiment of the invention described above, each cylinder block CBf and CBr is provided with only two cylinders. However, the cylinder blocks may each be provided with an even number of more than two cylinders arranged in parallel, in which case the cylinders in each cylinder block have equal firing intervals. Each pair of exhaust pipes connected to the particular cylinders which have firing intervals of 360° crank angle with respect to each other are joined into an exhaust manifold.

Having fully described our invention, it is to be understood that we are not to be limited to the details herein set forth but that our invention is of the full scope of the appended claims.

We claim:
1. A motorcycle having in combination
a frame body;
a V-type multicylinder internal combustion engine mounted on said frame body, said engine having a crankshaft transverse to said frame body, a front cylinder block extending forward toward the front of said frame body with its cylinder centerline inclined in the proximity of a horizontal plane and a rear cylinder block extending toward the top of said frame body with its cylinder centerline inclined in the proximity of a vertical plane, said cylinder blocks defining a V-shaped space therebetween, said engine having a plane of bisection extending through said crankshaft and bisecting said V-shaped space;
a fuel supply system including a front, downdraft carburetor extending to said front cylinder block and a rear, sidedraft carburetor extending to said rear cylinder block, said front and rear carburetors being positioned within said V-shaped space, said front carburetor being positioned generally forwardly of said plane of bisection and said rear carburetor being positioned generally rearwardly of said plane of bisection, said two carburetors each including at least one air intake port, said intake ports facing toward each other on opposite sides of said plane of bisection wherein said intake ports are laterally offset with respect to each other along the plane through the bisection.

* * * * *